(12) United States Patent
Lin et al.

(10) Patent No.: US 10,762,029 B2
(45) Date of Patent: Sep. 1, 2020

(54) ELECTRONIC APPARATUS AND DETECTION METHOD USING THE SAME

(71) Applicant: Wistron Corporation, New Taipei (TW)

(72) Inventors: Chun-Chih Lin, New Taipei (TW); Tung-Lin Lu, New Taipei (TW)

(73) Assignee: Wistron Corporation, New Taipei (TW)

( * ) Notice: Subject to any disclaimer, the term of this patent is extended or adjusted under 35 U.S.C. 154(b) by 206 days.

(21) Appl. No.: 15/210,897

(22) Filed: Jul. 15, 2016

(65) Prior Publication Data

US 2017/0277649 A1    Sep. 28, 2017

(30) Foreign Application Priority Data

Mar. 28, 2016  (TW) .............................. 105109605 A

(51) Int. Cl.
G06F 13/42 (2006.01)
G06F 11/30 (2006.01)

(52) U.S. Cl.
CPC ...... *G06F 13/4282* (2013.01); *G06F 11/3027* (2013.01)

(58) Field of Classification Search
CPC .......................... G06F 13/4282; G06F 11/3027

(Continued)

(56) References Cited

U.S. PATENT DOCUMENTS 4,516,199 A * 5/1985 Frieder ............... G06F 11/2736
710/20
5,500,946 A * 3/1996 Roden ..................... G06F 13/36
710/110

(Continued)

FOREIGN PATENT DOCUMENTS

CN        204046631           12/2014
CN        204046631 U   *    12/2014

(Continued)

OTHER PUBLICATIONS

"Office Action of Taiwan Counterpart Application" with partial English translation, dated Mar. 13, 2017, p. 1-p. 6, in which the listed references were cited.

(Continued)

*Primary Examiner* — Farley Abad
*Assistant Examiner* — Henry W Yu
(74) *Attorney, Agent, or Firm* — JCIPRNET

(57) ABSTRACT

An electronic apparatus and a detection method using the same are provided. The electronic apparatus includes a processor, a platform controller, and an auxiliary controller. The processor includes a first bus compatible with a first standard. The platform controller is coupled to the processor, and the processor is connected to peripheral devices of the electronic apparatus through the platform controller or the first bus according to the first standard. The auxiliary controller is coupled to the processor through the first bus, and the processor controls the auxiliary controller through a second bus and the platform controller. The auxiliary controller receives a detection signal to detect the processor, the platform controller, or at least one of the peripheral devices in the electronic apparatus through the first bus compatible with the first standard according to the detection signal.

9 Claims, 3 Drawing Sheets

(58) Field of Classification Search
USPC .................................... 710/15, 18, 110, 313
See application file for complete search history.

(56) References Cited

U.S. PATENT DOCUMENTS

| | | | | |
|---|---|---|---|---|
| 5,535,414 | A * | 7/1996 | Burge | G06F 13/423 |
| | | | | 710/100 |
| 5,619,706 | A * | 4/1997 | Young | G06F 13/24 |
| | | | | 710/111 |
| 5,822,553 | A * | 10/1998 | Gifford | G06F 13/122 |
| | | | | 710/305 |
| 6,496,790 | B1 * | 12/2002 | Kathavate | G01R 31/317 |
| | | | | 702/188 |
| 6,948,008 | B2 * | 9/2005 | Hawkins | G06F 11/2025 |
| | | | | 710/14 |
| 8,812,831 | B2 | 8/2014 | Cheng et al. | |
| 2005/0228932 | A1 * | 10/2005 | Chen | G06F 13/423 |
| | | | | 710/307 |
| 2006/0075286 | A1 * | 4/2006 | Hodge | G06F 11/2268 |
| | | | | 714/5.11 |
| 2012/0036347 | A1 | 2/2012 | Swanson et al. | |
| 2014/0215489 | A1 * | 7/2014 | Bhatia | G06F 9/546 |
| | | | | 719/313 |
| 2014/0281120 | A1 * | 9/2014 | Ellerbrock | G06F 12/0238 |
| | | | | 711/102 |
| 2015/0356034 | A1 * | 12/2015 | Pamley | G06F 13/1684 |
| | | | | 710/308 |
| 2017/0364375 | A1 * | 12/2017 | Ku | G06F 13/4027 |

FOREIGN PATENT DOCUMENTS

| | | |
|---|---|---|
| CN | 105302755 | 2/2016 |
| TW | I476571 | 3/2015 |

OTHER PUBLICATIONS

"Office Action of China Counterpart Application," dated Dec. 19, 2019, p. 1-p. 12.

* cited by examiner

ELECTRONIC APPARATUS AND DETECTION METHOD USING THE SAME

CROSS-REFERENCE TO RELATED APPLICATION

This application claims the priority benefit of Taiwan application serial no. 105109605, filed on Mar. 28, 2016. The entirety of the above-mentioned patent application is hereby incorporated by reference herein and made a part of this specification.

BACKGROUND OF THE INVENTION

Field of the Invention

The invention relates to an electronic apparatus and a detection method of an electronic apparatus.

Description of Related Art

A baseboard management controller (BMC) is adapted to manage a server system. Generally speaking, to monitor whether the internal operation of a computer system is normal, a user may use the BMC provided on the motherboard to detect the computer system. A common approach is remote-controlling the BMC to detect a reading of each sensor for sensing the operation of each device in the computer system (e.g., a fan speed or a processor temperature). However, devices that cannot be directly accessed by the BMC in the computer system will need to be diagnosed and tested though the operating system for detection, and the detection result will be returned to the BMC through a Platform Controller Hub (PCH). In this case, if hardware such as the central processing unit (CPU) or the PCH fails, it is completely impossible to detect the devices. Therefore, manufacturers have to seek better techniques and methods to realize remote detection of the computer system.

SUMMARY OF THE INVENTION

The invention provides an electronic apparatus and a detection method thereof. By connecting an auxiliary controller (e.g., a baseboard management controller) to a bus that is compatible with a first standard (e.g., the Peripheral Component Interconnect Express), each peripheral device in the electronic apparatus can be remotely detected through the first standard, and the detection range of the auxiliary controller can thereby be expanded.

An electronic apparatus of the invention includes a processor, a platform controller, and an auxiliary controller. The processor includes a first bus compatible with a first standard. The platform controller is coupled to the processor, wherein the processor is connected to at least one peripheral device of the electronic apparatus through the platform controller or the first bus by the first standard. The auxiliary controller is coupled to the processor through the first bus, wherein the processor controls the auxiliary controller through a second bus and the platform controller. The auxiliary controller receives a detection signal to detect the processor, the platform controller, or the at least one peripheral device in the electronic apparatus through the first bus compatible with the first standard according to the detection signal.

The detection method of an electronic apparatus of the invention is adapted for an electronic apparatus. The electronic apparatus includes a processor, a platform controller, and an auxiliary controller. The method includes the following steps: receiving a detection signal, wherein the auxiliary controller is coupled to the processor through a first bus compatible with a first standard, and the processor controls the auxiliary controller through a second bus and the platform controller; detecting the processor, the platform controller, or at least one peripheral device in the electronic apparatus through the first bus compatible with the first standard according to the detection signal; and returning a detection result.

In light of the above, in the embodiments of the invention, the auxiliary controller of the electronic apparatus is additionally connected to the first bus compatible with the first standard (e.g., the PCI-E) to be coupled to the processor and the platform controller. Moreover, the auxiliary controller is set as a terminal that is compatible with the first standard to thereby detect each of the devices (e.g., the processor, the platform controller, or the peripheral devices) in the electronic apparatus through the first bus compatible with the first standard and a peer-to-peer transaction function. Accordingly, the detection range of the auxiliary controller can be expanded. In other words, when the processor or the platform controller fails, the electronic apparatus of the invention can detect each of the devices in the electronic apparatus via the auxiliary controller through the first bus compatible with the first standard, and the function of remote detection is thereby reinforced.

To provide a further understanding of the aforementioned and other features and advantages of the disclosure, exemplary embodiments, together with the reference drawings, are described in detail below.

DESCRIPTION OF THE EMBODIMENTS

The following provides a plurality of embodiments to illustrate the invention. However, the invention is not limited to the plurality of illustrated embodiments. Moreover, adequate combination among the embodiments is also allowed. Throughout the text of the specification (including the claims), the term "couple" refers to any direct or indirect connection means. For example, where a first device is described to be coupled to a second device in the text, it should be interpreted that the first device may be directly connected to the second device, or that the first device may be indirectly connected to the second device through another device or some connection means. In addition, the term "signal" refers to at least a current, voltage, charge, temperature, data, electromagnetic wave, or any other one or more signals.

Figure 1:
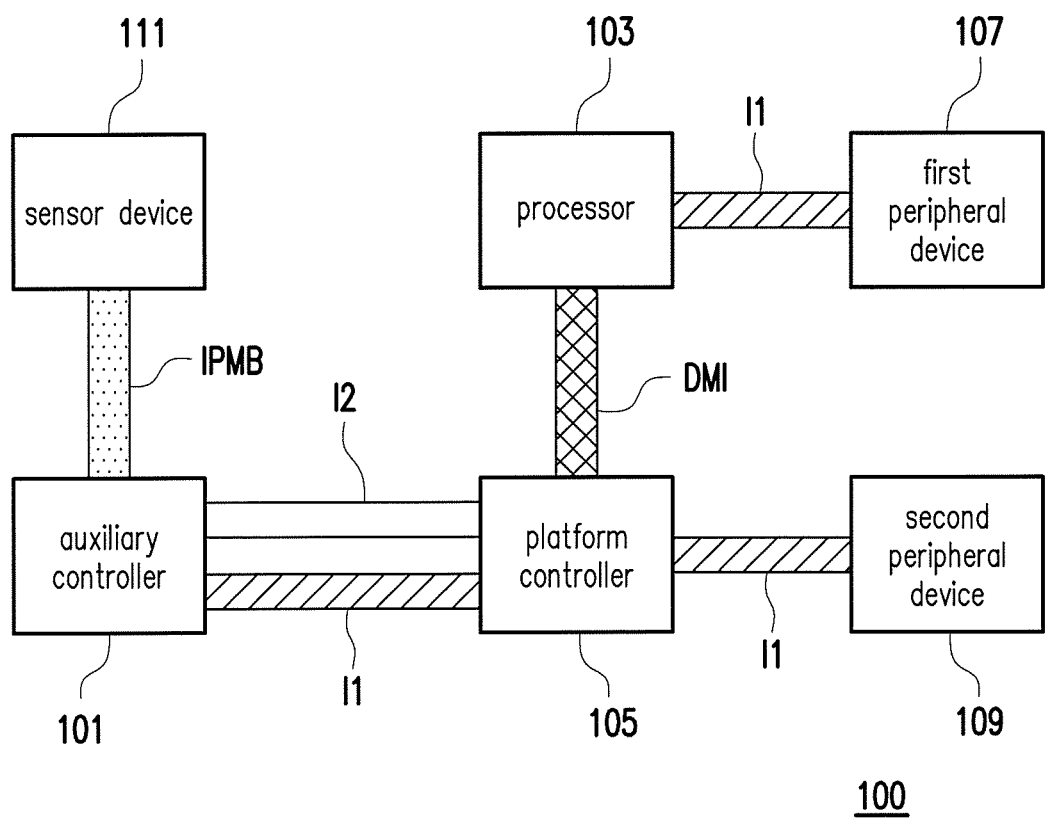
FIG. 1 is a block diagram illustrating an electronic apparatus according to one embodiment of the invention.

FIG. 1 is a block diagram illustrating an electronic apparatus according to one embodiment of the invention. Referring to FIG. 1, in the present embodiment, an electronic apparatus 100 includes an auxiliary controller 101, a processor 103, a platform controller 105, a first peripheral device 107, a second peripheral device 109, and a sensor device 111. The processor 103 is, for example, a central processing unit (CPU), or another programmable microprocessor, digital signal processor (DSP), programmable controller, application specific integrated circuits (ASIC), programmable logic device (PLD) for general or specific purposes, another similar device, or a combination of the foregoing devices. The processor 103 includes a first bus I1 compatible with a first standard. In the present embodiment, the processor 103 is, for example, a CPU, and the first standard is, for example, the Peripheral Component Interconnect Express (PCI-E). The processor 103 can execute an operating system in the electronic apparatus 100 and be coupled to a plurality of peripheral devices in the electronic apparatus 100 through the platform controller 105 or the first bus I1 compatible with the first standard to access the peripheral devices. In the present embodiment, the platform controller 105 is, for example, a Platform Controller Hub (PCH) and is, for example, connected to the processor 103 through a Direct Media Interface (DMI) compatible with the PCI-E.

The first peripheral device 107 is a device that is compatible with the first standard and is connected to the processor 103 through the first bus I1 compatible with the first standard. In the present embodiment, the first peripheral device 107 is, for example, a device that is compatible with the PCI-E, such as a sound card or a video card. The first peripheral device 107 may be referred to as a directly connected peripheral device compatible with the first standard (the PCI-E). The platform controller 105 is connected to the second peripheral device 109 through the first bus I1 compatible with the first standard. In the present embodiment, the second peripheral device 109 is, for example, another I/O device that is compatible with communication protocols such as Serial Advanced Technology Attachment (SATA), the Universal Serial Bus (USB), or the local area network (LAN). The platform controller 105 is coupled to the second peripheral device 109 through the first bus I1 compatible with the first standard (the PCI-E) or a bus of a communication protocol that is compatible with the second peripheral device 109, such that the second peripheral device 109 may be referred to as an indirectly connected peripheral device compatible with the first standard (the PCI-E). Accordingly, the processor 103 can be connected to and access the first peripheral device 107 (directly connected peripheral device) in the electronic apparatus 100 through the first bus I1 compatible with the first standard, and can be connected to and access the second peripheral device 109 (indirectly connected peripheral device) in the electronic apparatus 100 through the platform controller 105. In the present embodiment, the processor 103 can set each of the peripheral devices (e.g., the first peripheral device 107 and the second peripheral device 109) as a plurality of terminals that are compatible with the first standard (the PCI-E) to thereby perform operations such as data accessing or detecting.

The auxiliary controller 101 is, for example, a microprocessor, another programmable microprocessor, digital signal processor (DSP), programmable controller, application specific integrated circuits (ASIC), programmable logic device (PLD), or another similar device. In the present embodiment, the auxiliary controller 101 is, for example, a baseboard management controller. The auxiliary controller 101 is, for example, connected to the sensor device 111 through an Intelligent Platform Management Bus (IPMB) to test the sensor device 111 provided in the electronic apparatus 100. In the present embodiment, the sensor device 111 is, for example, a device such as a sensor for monitoring a fan speed, a processor temperature, etc., an Ethernet manager, or a debug serial port. Generally speaking, the baseboard management controller is connected to the platform controller 105 through a second bus I2 (e.g., a System Management Bus (SMBus) or a Low Pin Count Bus (LPC Bus)) to be further coupled to the processor 103. Accordingly, in the present embodiment, the processor 103 can control the auxiliary controller 101 through the second bus I2 and the platform controller 105. Specifically speaking, the processor 103 can issue an Intelligent Platform Management Interface (IPMI) command through the second bus I2 and the platform controller 105 to the auxiliary controller 101 to instruct the auxiliary controller 101 to test the sensor device 111 provided in the electronic apparatus 100.

To allow the auxiliary controller 101 to more thoroughly detect and diagnose each of the peripheral devices in the electronic apparatus 100, the auxiliary controller 101 (e.g., the baseboard management controller) in the present embodiment is also connected to the platform controller 105 through the first bus I1 to be further coupled to the processor 103. Since the first standard supports a peer-to-peer transaction function, under the first standard, each of the terminals on each of the buses (e.g., the first bus I1) compatible with the first standard can directly communicate with each other without going through other devices (e.g., the CPU). For example, the processor 103, the platform controller 105, the first peripheral device 107, and the second peripheral device 109 in the electronic apparatus 100 can all be seen as terminals that are compatible with the first standard. When the auxiliary controller 101 is set as one of the terminals that are compatible with the first standard, even when the processor 103 or the platform controller 105 fails, the auxiliary controller 101 (e.g., the baseboard management controller) can still directly detect the processor 103, the platform controller 105, the first peripheral device 107, or the second peripheral device 109 through the first bus I1 compatible with the first standard by the peer-to-peer transaction function to thereby determine whether the devices function normally. Detailed accessing and determining methods will be described below.

Figure 2:
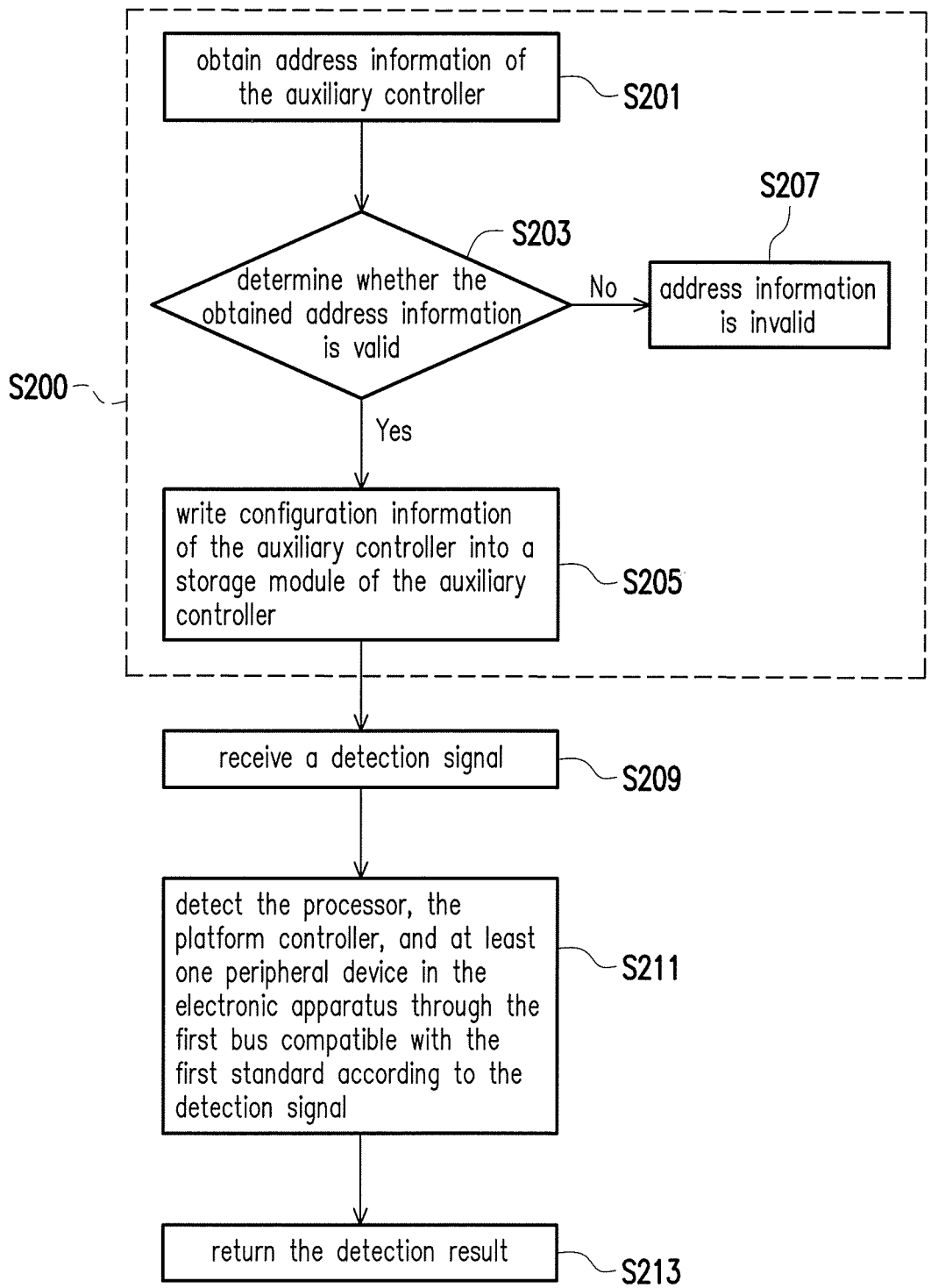
FIG. 2 is a flowchart illustrating a detection method of an electronic apparatus according to one embodiment of the invention.

FIG. 2 is a flowchart illustrating a detection method of an electronic apparatus according to one embodiment of the invention. The method of the present embodiment applies to the electronic apparatus 100 in FIG. 1. The electronic apparatus 100 mainly includes the processor 103, the platform controller 105, and the auxiliary controller 101. The following describes detailed steps of the method of the present embodiment with reference to the components of the electronic apparatus 100 in FIG. 1.

Referring to FIG. 2, in step S200, the auxiliary controller 101 is set as one of a plurality of terminals that are compatible with the first standard. If this step has been completed in advance, it is not obligatory to proceed with step S201. Instead, step S200 may be ignored to enter step S209. In FIG. 2, step S200 is further divided into a plurality of detailed steps S201, S203, S205, and S207. In step S201, the auxiliary controller 101 obtains address information of the auxiliary controller 101. In the present embodiment, the auxiliary controller 101 is, for example, a baseboard management controller of which a PCI-E address consists of Bus/Device/Function/Register stipulated under the PCI. It is, for example, factory default setting, or is set by a user at the BIOS stage. However, the invention is not limited hereto. After the auxiliary controller 101 obtains the address information of the auxiliary controller 101, the auxiliary controller 101 determines whether the obtained address information is valid in step S203. In the present embodiment, the auxiliary controller 101 (i.e., the baseboard management controller) scans PCI-E addresses of all PCI-E terminals in all PCI-E buses and determines whether the PCI-E address obtained in step S201 is valid. If the PCI-E address obtained in step S201 overlaps with one of the PCI-E addresses scanned in step S203, it is determined that the PCI-E address obtained in step S201 is invalid (step S207). Otherwise, it is determined that the PCI-E address obtained in step S201 is valid, and step S205 proceeds accordingly.

In step S205, the auxiliary controller 101 writes configuration information of the auxiliary controller 101 into a storage module of the auxiliary controller 101. Generally speaking, a PCI-E address may represent a terminal or a PCI-E device, and each terminal or each device has a PCI configuration space to represent its attribute. Here, "configuration information" may be PCI configuration space information in the PCI configuration space. In the present embodiment, the PCI configuration space information of the auxiliary controller 101 (e.g., the baseboard management controller) is, for example, a variety of information including the vender ID, the device ID, the Base Address Register (BAR), etc. stipulated under the PCI.

After completing the foregoing step S200 (including steps S201, S203, S205, and S207), the auxiliary controller 101 is set as one of the terminals that are compatible with the first standard (e.g., the PCI-E), such that according to its address information and configuration information, the other terminals on the bus can be accessed through the first bus I1 compatible with the first standard by the peer-to-peer transaction function in the first standard. Specifically speaking, the auxiliary controller 101 (i.e., the baseboard management controller) can transmit Transaction Layer Packets (TLPs) according to its PCI-E address information and PCI configuration space information to access the register of the processor 103, the platform controller 105, the first peripheral device 107, or the second peripheral device 109.

Referring to FIG. 2 again, in step S209, the auxiliary controller 101 receives a detection signal. In the present embodiment, the auxiliary controller 101 (e.g., the baseboard management controller) includes a network module and receives a remote detection signal through the network module. The detection signal, for example, instructs the auxiliary controller 101 to detect whether the first peripheral device 107 functions normally, or instructs the auxiliary controller 101 to detect whether all the devices it can access function normally. However, the invention is not limited hereto. Next, if the received detection signal instructs the auxiliary controller 101 to detect whether the processor 103, the platform controller 105, the first peripheral device 107, or the second peripheral device 109 in the electronic apparatus 100 functions normally, then in step S211, according to the received detection signal, the auxiliary controller 101 accesses the register of the processor 103, the platform controller 105, the first peripheral device 107, or the second peripheral device 109 corresponding to the detection signal through the first bus I1 compatible with the first standard by the peer-to-peer transaction function of the first standard. In the present embodiment, the detection signal received by the auxiliary controller 101, for example, instructs the auxiliary controller 101 to detect the first peripheral device 107. In step S211, the auxiliary controller 101 transmits the Transaction Layer Packets according to its PCI-E address information and PCI configuration space information to access the register of the first peripheral device 107. Through accessing the register of the device corresponding to the detection signal, in step S213, the auxiliary controller 101 can determine whether the device corresponding to the detection signal functions normally and returns a detection result. In the present embodiment, the auxiliary controller 101 can, for example, command the first peripheral device 107 to perform a specific operation through accessing the register of the first peripheral device 107, and then determine whether a state of the first peripheral device 107 is consistent with an expected result of the foregoing specific operation through accessing the register of the first peripheral device 107, so as to detect whether the first peripheral device 107 functions normally and return the detection result.

Accordingly, the electronic apparatus 100 can directly detect the processor 103, the platform controller 105, the first peripheral device 107, or the second peripheral device 109 through the auxiliary controller 101 and return the detection result. It should be noted that in one embodiment of the invention, the electronic apparatus 100 further includes a power module, and the power module constantly provides auxiliary power to the electronic apparatus 100 when the electronic apparatus 100 is on standby. The auxiliary controller 101 can use the auxiliary power as the power for performing operations including receiving the detection signal, detecting the devices in the electronic apparatus 100, returning the detection result, etc.

In one embodiment of the invention, the auxiliary controller 101, for example, also receives the detection signal through the network module to instruct the auxiliary controller 101 to detect the sensor device 111. At this moment, if the auxiliary controller 101 is a baseboard management controller, and is, for example, connected to the sensor device 111 through an Intelligent Platform Management Bus (IPMB), the auxiliary controller 101 can directly access the sensor device 111 through the IPMB. Accordingly, even when the electronic apparatus 100 is on standby, the CPU fails, or the operating system cannot be run, the electronic apparatus 100 can still receive the detection signal through the auxiliary controller 101 and detect the device (e.g., the processor 103, the platform controller 105, the first peripheral device 107, the second peripheral device 109, or the sensor device 111) indicated by the detection signal to determine whether the devices function normally.

In the foregoing embodiment, the auxiliary controller 101 is, for example, a baseboard management controller of the electronic apparatus 100, and the electronic apparatus 100 executes the detection method of an electronic apparatus through the baseboard management controller. However, the invention is not limited hereto. In another embodiment, the auxiliary controller 101 is, for example, implemented by an embedded controller, and the electronic apparatus 100 executes the detection method of an electronic apparatus through the embedded controller.

Figure 3:
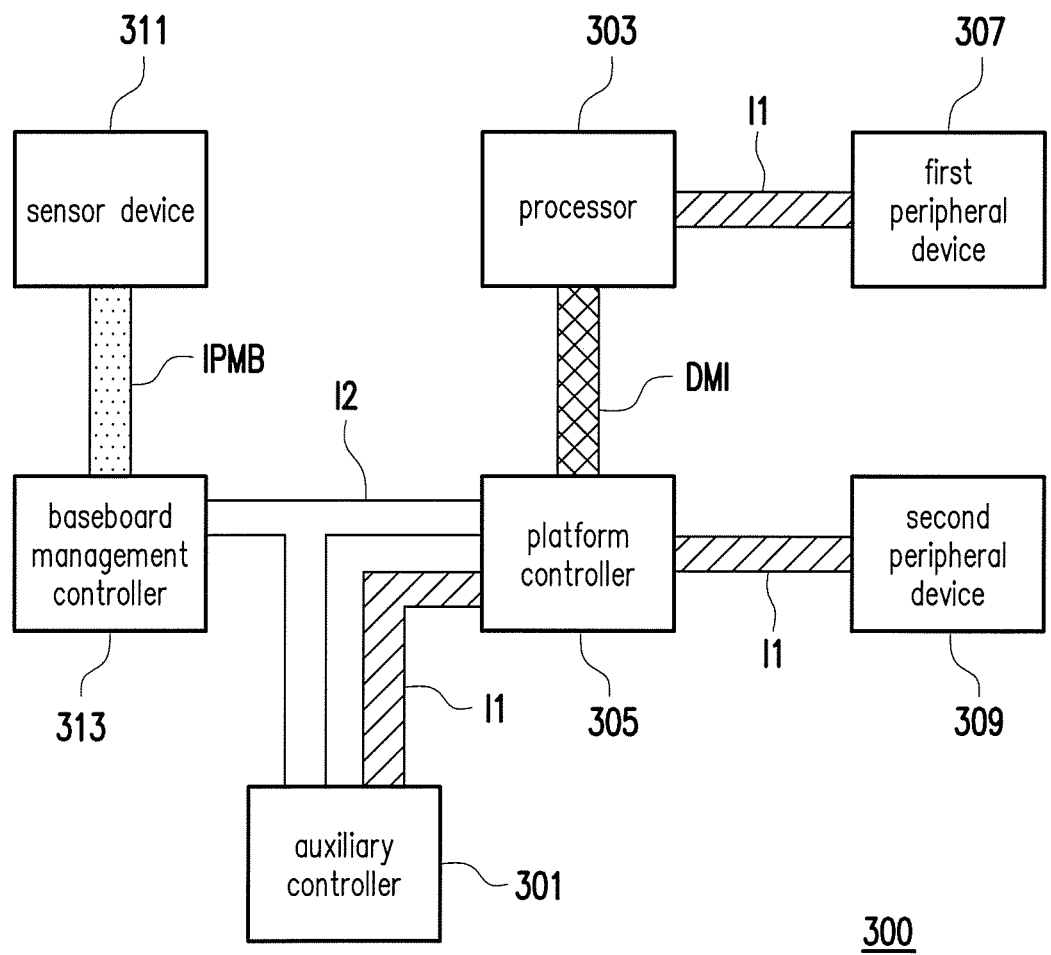
FIG. 3 is a block diagram illustrating an electronic apparatus according to another embodiment of the invention.

FIG. 3 is a block diagram illustrating an electronic apparatus according to another embodiment of the invention. Referring to FIG. 3, an electronic apparatus 300 includes an auxiliary controller 301, a processor 303, a platform controller 305, a first peripheral device 307, a second peripheral device 309, a sensor device 311, and a baseboard management controller 313. In the present embodiment, the auxiliary controller 301 is, for example, an embedded controller, including an input module and a network module for receiving a detection signal. The auxiliary controller 301, the platform controller 305, and the baseboard management controller 313 are connected to each other through a second bus I2 (e.g., a System Management Bus (SMBus) or a Low Pin Count Bus (LPC Bus)), and the auxiliary controller 301 and the platform controller 305 are further connected to each other through a first bus I1 compatible with a first standard. Moreover, as illustrated in FIG. 3, the other devices in the electronic apparatus 300 and the connection therebetween have all been detailed in the foregoing embodiments and shall not be repeated here.

Similarly, since the first standard supports a peer-to-peer transaction function, under the first standard, terminals on buses (e.g., the first bus I1) compatible with the first standard can directly communicate with each other without going through other devices (e.g., the CPU). For example, in the present embodiment, when the processor 303 or the platform controller 305 fails, the auxiliary controller 301 (e.g., the embedded controller) can still directly access the first peripheral device 307 or the second peripheral device 309 through the first bus I1 compatible with the first standard to detect whether the first peripheral device 307 or the second peripheral device 309 functions normally. Moreover, in the present embodiment, the auxiliary controller 301 can further instruct the baseboard management controller 313 through the second bus 12 to detect the sensor device 311. The auxiliary controller 301 accesses the processor 303, the platform controller 305, the first peripheral device 307, or the second peripheral device 309 through the first bus I1 compatible with the first standard in a way that is similar to the detection method of an electronic apparatus presented in the foregoing embodiments of FIGS. 1 and 2 and shall not be repeated here.

In summary of the above, in the embodiments of the invention, the auxiliary controller of the electronic apparatus is additionally connected to the first bus compatible with the first standard (e.g., the PCI-E) to be coupled to the processor and the platform controller. Moreover, the auxiliary controller is set as a terminal that is compatible with the first standard to thereby detect each of the devices (e.g., the processor, the platform controller, or the peripheral devices) in the electronic apparatus through the first bus I1 compatible with the first standard and the peer-to-peer transaction function. Accordingly, the electronic apparatus and the detection method thereof described in the embodiments of the invention can expand the detection range of the auxiliary controller. On the other hand, the auxiliary controller in the embodiments of the invention can operate through auxiliary power. Hence, through the electronic apparatus and the detection method thereof provided in the embodiments of the invention, when each of the devices cannot be detected or diagnosed through the operating system due to the standby of the electronic apparatus or damage to the processor or other devices, the auxiliary controller can still directly access the device to be detected through the first bus compatible with the first standard by the peer-to-peer transaction function of the first standard, and the function of remote detection is thereby reinforced.

Although the invention is disclosed in the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An electronic apparatus comprising:
    a processor comprising a first bus compatible with a first standard;
    a platform controller coupled to the processor, wherein the processor is connected to a peripheral device of the electronic apparatus through the platform controller or the first bus by the first standard;
    an auxiliary controller connected to the platform controller through the first bus and is coupled to the processor, wherein the processor controls the auxiliary controller through a second bus and the platform controller; and
    a sensor device connected to the auxiliary controller through an Intelligent Platform Management Bus (IPMB), wherein the sensor device is tested by the auxiliary controller according to an instruction received from the processor through the second bus,
    wherein the auxiliary controller receives a detection signal to detect the processor, the platform controller, or the peripheral device in the electronic apparatus through the first bus according to the detection signal,
    wherein the auxiliary controller is connected to the platform controller through the first bus and the second bus directly, and separate connections of the first bus and the second bus are connected in parallel for connecting between the platform controller and the auxiliary controller,
    wherein the first standard is the Peripheral Component Interconnect Express,
    wherein the auxiliary controller is set as one of a plurality of terminals that are compatible with the first standard, and the auxiliary controller detects the processor, the platform controller, or the peripheral device in the electronic apparatus through a peer-to-peer transaction function in the first standard.

2. The electronic apparatus according to claim 1, wherein the second bus is not compatible with the first standard.

3. The electronic apparatus according to claim 1, wherein the auxiliary controller uses auxiliary power of the electronic apparatus as power for performing operations.

4. The electronic apparatus according to claim 1, wherein the auxiliary controller is a baseboard management controller, wherein the baseboard management controller comprises a network module, and the auxiliary controller receives the detection signal through the network module.

5. The electronic apparatus according to claim 1, wherein the second bus is a System Management Bus or a Low Pin Count Bus.

6. A detection method of an electronic apparatus, wherein the electronic apparatus comprises a processor, a platform controller, a sensor device, and an auxiliary controller, the detection method comprising:
    receiving a detection signal, wherein the auxiliary controller is connected to the platform controller through a first bus compatible with a first standard and is coupled to the processor, and the processor controls the auxiliary controller through a second bus and the platform controller, wherein the auxiliary controller is connected to the sensor device through an Intelligent Platform Management Bus (IPMB), wherein the sensor device is tested by the auxiliary controller according to an instruction received from the processor through the second bus;
    detecting the processor, the platform controller, or a peripheral device in the electronic apparatus through the first bus according to the detection signal; and
    returning a detection result,
    wherein the auxiliary controller is connected to the platform controller through the first bus and the second bus directly, and separate connections of the first bus and the second bus are connected in parallel for connecting between the platform controller and the auxiliary controller,
    wherein the first standard is the Peripheral Component Interconnect Express,
    wherein the auxiliary controller is set as one of a plurality of terminals that are compatible with the first standard, and the auxiliary controller detects the processor, the platform controller, or the peripheral device in the electronic apparatus through a peer-to-peer transaction function in the first standard.

7. The detection method of an electronic apparatus according to claim 6, further comprising:
    setting the auxiliary controller as one of a plurality of terminals that are compatible with the first standard.

8. The detection method of an electronic apparatus according to claim 7, wherein the step of setting the auxiliary controller as one of the plurality of terminals that are compatible with the first standard comprises the following steps:
    obtaining address information of the auxiliary controller;
    determining whether the address information is valid; and
    writing configuration information of the auxiliary controller into a storage module of the auxiliary controller, when the address information is valid,
    wherein the address information and the configuration information are compatible with the first standard.

9. The detection method of an electronic apparatus according to claim 8, wherein the step of detecting the processor, the platform controller, or the peripheral device in the electronic apparatus through the first bus according to the detection signal comprises the following steps:
    detecting the processor, the platform controller, or the peripheral device in the electronic apparatus through a peer-to-peer transaction function in the first standard according to the address information and the configuration information.

\* \* \* \* \*